United States Patent [19]

Hirano et al.

[11] 4,045,539
[45] Aug. 30, 1977

[54] PROCESS FOR DECONTAMINATING GAS CONTAINING RADIOACTIVE IODINE

[75] Inventors: Mikio Hirano; Masaki Takeshima; Toru Saito; Atou Shimozato, all of Hitachi, Japan

[73] Assignee: Hitachi, Ltd., Japan

[21] Appl. No.: 546,192

[22] Filed: Jan. 31, 1975

[30] Foreign Application Priority Data

Feb. 1, 1974   Japan ............................ 49-12778

[51] Int. Cl.² ............................................. B01D 53/34
[52] U.S. Cl. ................................ 423/240; 423/241; 423/245; 55/71; 55/74
[58] Field of Search ............... 423/210, 240, 500, 241, 423/503; 55/71, 74

[56] References Cited

U.S. PATENT DOCUMENTS

| 3,429,103 | 2/1969 | Taylor | 423/240 X |
| 3,720,043 | 3/1973 | Kovach | 55/74 |

*Primary Examiner*—Earl C. Thomas
*Attorney, Agent, or Firm*—Craig & Antonelli

[57] ABSTRACT

A vent gas containing radioactive iodine and methyliodide is effectively decontaminated by chemically adsorbing the iodine contained in the vent gas onto an activated carbon layer at first, then physically adsorbing the methyl iodide contained in the vent gas onto another activated carbon layer separately disposed from the former activated carbon layer, and retaining the radioactive iodine and radioactive methyl iodide on the respective activated carbon layers for a definite period of radioactive decay.

15 Claims, 3 Drawing Figures

PROCESS FOR DECONTAMINATING GAS CONTAINING RADIOACTIVE IODINE

BACKGROUND OF THE INVENTION

This invention relates to a process for continuously, effectively and safely treating volatile, radioactive iodine evolving from atomic power stations by adsorption.

With a considerable increase in number of construction of atomic power stations in these years, an amount of radioactive iodine discharged to the atmosphere is increasing year by year, and a hazard of the discharged radioactive iodine upon the human bodies becomes very serious. Even a small amount of the discharged radioactive iodine must be prevented from absorption into the human bodies.

Heretofore, vent gas lines of machinery and apparatus of atomic power station have been connected to a ventilating and air conditioning duct, and the vent gas has been discharged to the atmosphere from a stack without any treatment. Thus, an exposure of the volatile, radioactive iodine present in the air to human beings and animals has not been prevented. Atomic power stations are provided with emergency gas treating apparatus for removing radioactive iodine contained in the vent gas in the housing of nuclear reactor at a nuclear reactor accident, but such apparatus are only for emergency purpose, and are not possible to operate in a prolonged period of time continuously. Thus, it is not preferable from the standpoints of safety and reliability to utilize such apparatus in the normal operation. That is, such apparatus are impossible to regenerate and operate continuously, and thus an adsorption column of large longitudinal dimension is required. These are the disadvantages inherent in such apparatus. Thus, an art of continuously and effectively removing the radioactive iodine has been desired.

SUMMARY OF THE INVENTION

An object of the present invention is to provide a process for continuously and effectively removing volatile, radioactive iodine without any disadvantage of said prior art.

The present invention is characterized by a process for decontaminating a vent gas containing radioactive iodine and radioactive methyl iodide, which comprises chemically adsorbing iodine onto an activated carbon layer at first, retaining the adsorbed iodine in a tightly sealed state for a predetermined period of time, after the adsorption of iodine reaches an almost saturated state thereby decaying radioactivity of the adsorbed iodine, desorbing the adsorbed iodine by heating when the decay of the radioactivity is completed thereby regenerating the activated carbon, the foregoing step being carried out simultaneously by repetition and switching by means of a plurality of activated carbon-packed layers, and leading the vent gas leaving the iodine adsorption step to another activated carbon packed layer separately provided, after heating the vent gas, and repeatedly effecting physical adsorption and desorption of methyl idoide, while retaining the adsorbed methyl iodide therein for a predetermined period of time, thereby decaying the radioactivity of methyl iodide.

The present invention is based on said structure and function, and the following effects can be attained thereby. That is;

1. The adsorption columns are separately provided for iodine adsorption and methyl iodide retaining, and thus a column of large longitudinal dimension, as used so far, is not required. That is, construction cost of the entire apparatus is reduced.
2. Since the adsorption columns are operated by switching, it is possible to treat the vent gas in a continuous manner.
3. Owing to an appropriate arrangement of a heater for preventing a decrease in the percent removal due to an increase in relative humidity and a heater for desorption, the marked percent removal of the radioactive materials can be obtained in a heat-economical sense.

DESCRIPTION OF THE PREFERRED EMBODIMENTS

In the present invention, the following principles are utilized to safely and continuously remove radioactive iodine $I_2$ (iodine) including $CH_3I$ (methyl iodide) contained in a gas. That is, the present invention is based on an adsorption process by activated carbon in principle.

1. $I_2$ and $CH_3I$ have different adsorbabilities toward the activated carbon. $I_2$, once adsorbed on the activated carbon, is difficult to desorb, and thus the adsorption proceeds to a saturation state in the manner of the so-called chemical adsorption, requiring regeneration. On the other hand, $CH_3I$, even if adsorbed onto the activated carbon, is easy to desorb, and the adsorption proceeds in the manner of the so-called physical adsorption, while repeating adsorption-desorption.
2. Half-life of $I^{131}$ is as short as 8 days, and a sufficient retention time for decaying the radioactivity concentration to one-thousandth is only about 80 days. Suppose the retention time be $d$, $d/0.58 = 1/1000$. Thus $d \approx 80$.
3. Percent removal of $I_2$ by adsorption on the activated carbon is very high, irrespectively of the relative humidity, whereas that of $CH_3I$ is good up to the relative humidity of 40%, but is suddenly decreased over that relative humidity of 40%.

Now, the present invention will be described in detail, referring to the accompanying drawings.

Figure 1:
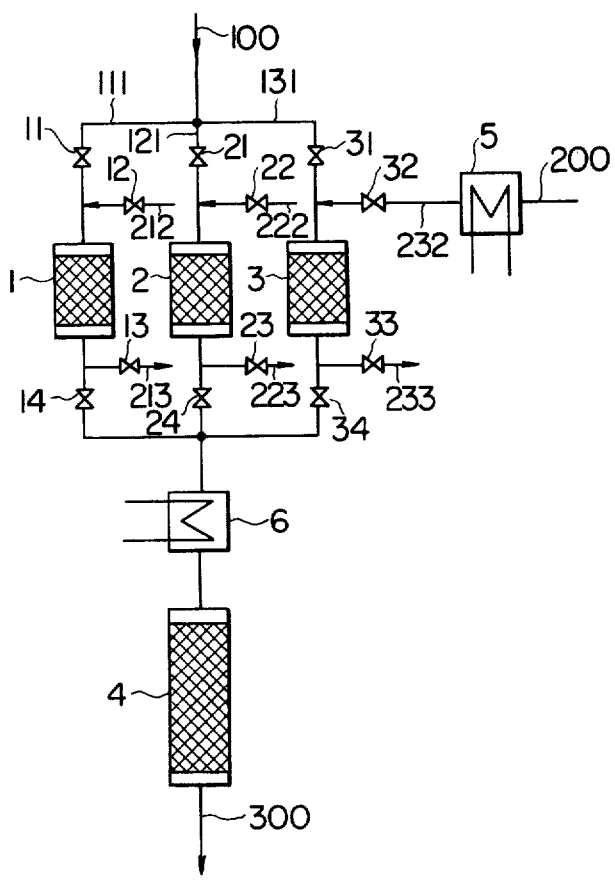
FIG. 1 is a schematic flowdiagram for carrying out the present process.

In FIG. 1, a schematic flowdiagram of the present invention is shown, where numerals 1, 2 and 3 are primary adsorption columns; 4 a secondary adsorption column; 5 and 6 heaters; 11 - 14, 21 - 24 and 31 - 34 valves; 100, 200, 300 111, 121, 131, 212, 213, 222, 223, 232 and 233 pipings. The primary adsorption columns 1, 2 and 3 and the secondary adsorption column 4 are the columns packed with activated carbon. The heaters 5 and 6 heat a relatively inert gas such as air, etc., utilizing a steam.

The three primary adsorption columns are provided in a switchable manner, as shown in FIG. 1, and the relatively inert gas heated by the heaters can be supplied to the respective adsorption columns.

Since the system of the present invention is constituted as given above, the system functions as follows. A vent gas containing radioactive iodine ($I_2$) and radioactive methyl iodide (CH₃I) is supplied through pipe 100. First of all, valves 21, 31, 12, 22, 13, 23, 24 and 34 are closed, and only valves 11, 14, 32 and 33 are opened. In this manner, the vent gas can pass only through adsorption column 1, where 99.9% of the iodine is selectively adsorbed, because the adsorbability of iodine on the activated carbon is about ten times that of methyl iodide. When the vent gas is continuously passed through adsorption column 1, the activated carbon in adsorption column 1 will reach a saturation state, and the successive adsorption will be impossible. Thus, it is necessary to effect regeneration and desorption of adsorption column 1. However, if the desorption and venting are carried out immediately, the vent gas evolving from a stack will cause a radioactive contamination hazard to human beings and animals. Thus, adsorption column 1 is kept in a tightly sealed state for about 80 days to reduce the radioactivity concentration to 1/1000. In FIG. 1, adsorption column 2 is retained in the tightly sealed state for decaying the radioactivity, and adsorption column 3 is completed with the retention for about 80 days, where the radioactivity has been reduced to 1/1000. Relatively inert gas such as air, etc. is introduced through pipings 200 and 232 and valve 32 to adsorption column 3 after being heated by heater 5, to desorb the decayed iodine in adsorption column 3 from the activated carbon and regenerate the activated carbon. The relatively inert gas containing the decayed iodine is led to a duct of ventilating and air-conditioning system through valve 33, and vented to the atmosphere from a stack (not shown in the drawing).

The vent gas containing the radioactive methyl iodide after the adsorption of 99.9% of the radioactive iodine (I₂) in adsorption column 1 is heated by heater 6 to prevent a decrease in the percent removal due to an increase in the relative humidity, and then led to adsorption column 4. Adsorption column 4 is the column packed with activated carbon, where repetitions of adsorption and desorption of methyl iodide, that is, the so-called physical adsorption, is carried out.

If a retention time of the vent gas in adsorption column 4 is made to be about 80 days to reduce the radioactivity concentration to 1/1000, as described above, by repetitions of adsorption and desorption, the vent gas can be discharged directly to the atmosphere from adsorption column 4. Even if adsorption column 4 is subjected to such a long period of retention in that case, the adsorption never proceeds in one direction, and thus it is not necessary to effect regeneration and desorption.

In FIG. 1, it is shown that adsorption column 1 is operated for iodine adsorption, adsorption column 2 for retention for decaying the radioactivity, and adsorption column 3 for regeneration and desorption. Operations of these columns are switched to one another at a time interval of 80 days. When these adsorption columns are designed on identical design specification on the basis of said decay retention time of 80 days, it is possible to continuously treat a vent gas containing iodine and methyl iodide.

That is to say, when the iodine adsorption of adsorption column 1 reaches a saturation state, only valves 21, 24, 12 and 13 are made open, while other valves are closed, to switch adsorption column 2 to iodine adsorption purpose, adsorption column 3 to decay retention purpose and adsorption column 1 to regeneration and desorption purpose. When adsorption column 2 is then saturated, only valves 31, 34, 22 and 23 are made open, while other valves are closed, to switch adsorption column 3 to iodine adsorption purpose, adsorption column 1 to decay retention purpose, and adsorption column 2 to regeneration and desorption purpose. Thus, the adsorption columns are utilized by recyclic switching.

Now, mention is made of heating temperatures of heaters 5 and 6 shown in FIG. 1.

Figure 2:
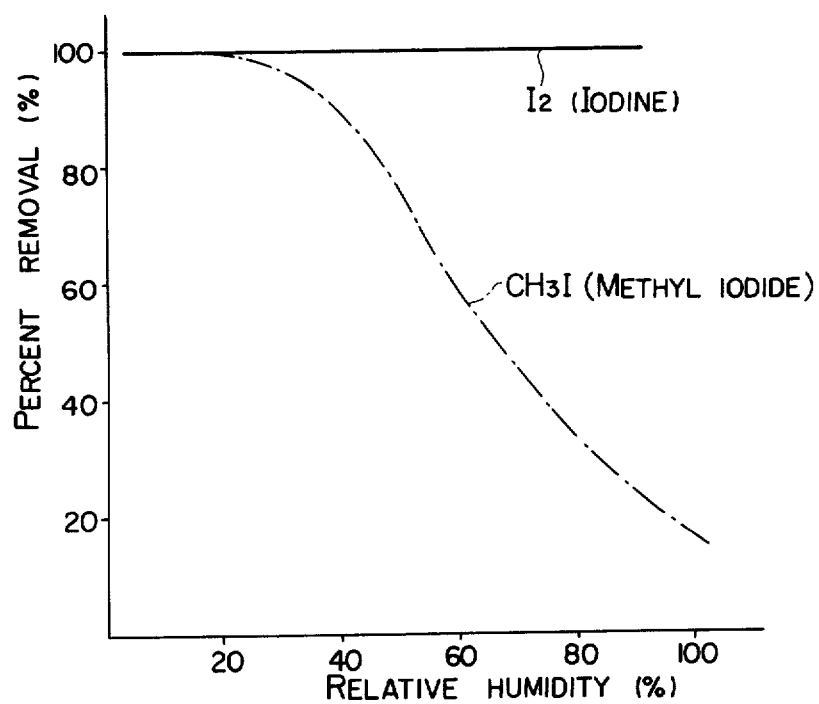
FIG. 2 is a characteristic diagram showing relations between relative humidity and percent removal of iodine and methyl iodide.

In FIG. 2, relations between percent removals (%) of iodine (I₂) and methyl iodide (CH₃I) and relative humidity (%) of vent gas are shown. As apparent from FIG. 2, percent removal of iodine (I₂) is as high as about 100%, (exactly 99.9%), irrespectively of relative humidity (%), whereas that of methyl iodide (CH₃I) is abruptly reduced when the relative humidity exceeds 40%.

Figure 3:
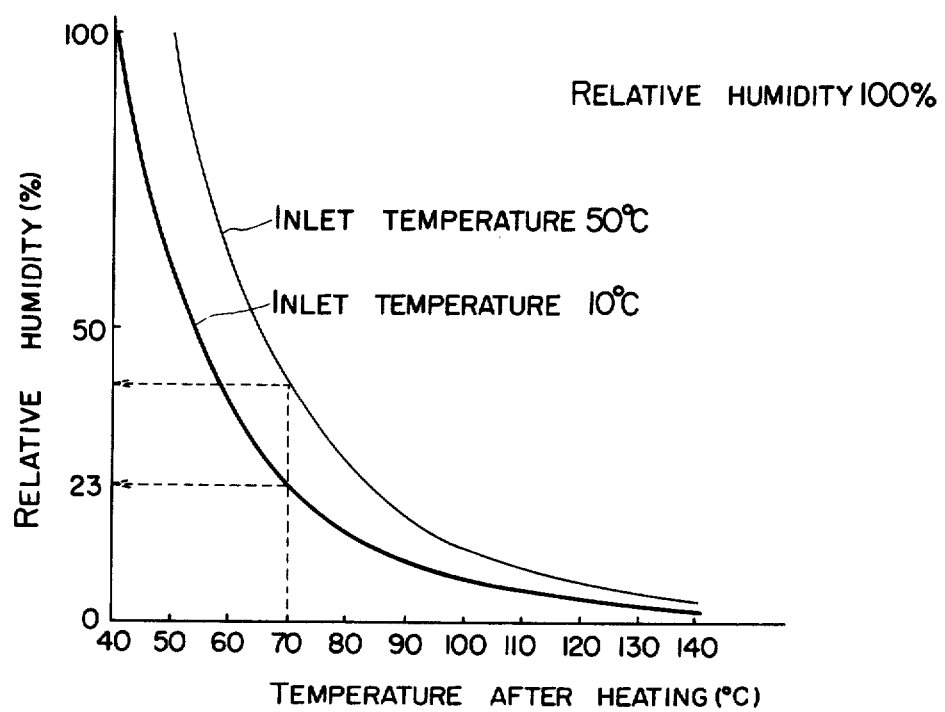
FIG. 3 is a characteristic diagram showing relations between gas temperature after heating and relative humidity.

In FIG. 3, relations between temperatures after heating of vent gas and relative humidity are shown, where it is indicated that the relative humidity will be less than 40%, when the vent gas having inlet temperatures 40° C and 50° C are heated to at least 70° C.

Furthermore, since equilibrium ratios of iodine adsorption are 1/10 at a temperature difference of 100° C and 1/100 at a temperature difference of 200° C, and the ratio of 1/100 is economical, it is necessary to provide a temperature difference of about 200° C to desorb the iodine adsorbed in adsorption columns 1 to 3.

Therefore, it is necessary to heat the relatively inert gas (regeneration gas) such as air, etc. to 200° to 250° C for desorption. While it is also necessary to heat the vent gas containing methyl iodide to at least 70° C at the outlet of heater 6 to keep the relative humidity to less than 40%, that is, to obtain the economical percent removal of more than 90%. In that case, the relative humidity of the vent gas at the inlet of heater 6 was presumed to be the worst condition, that is, 100%.

In the foregoing embodiment of the present invention, operations of three adsorption columns by switching are illustrated, but the present invention is not limited to such embodiment, and an arrangement of even more than three columns including simultaneous treatment in a plurality of columns is possible.

What is claimed is:

1. A process for decontaminating a vent gas containing radioactive iodine and radioactive methyl iodide, which comprises (1) chemically adsorbing iodine onto an activated carbon layer, (2) retaining the adsorbed iodine in a tightly sealed state for a predetermined period of time after the adsorption of iodine reaches a saturated state thereby decaying the radioactivity of the adsorbed iodine, (3) desorbing the adsorbed iodine by heating when decay of the radioactivity is completed thereby regenerating the activated carbon, (4) heating the vent gas passing out of said activated carbon layer during iodine adsorption, and (5) passing the heated vent gas through another activated carbon packed layer thereby decaying the radioactivity of the methyl iodide.

2. The process of claim 1 wherein radioactive iodine is adsorbed by and desorbed from at least three separate activated carbon layers operated in series, one of said separate activated carbon layers undergoing desorption and a second of said separate activated carbon layers being sealed for decay of the radioactivity of adsorbed iodine while a third of said separate activated carbon layers adsorbs radioactive iodine from said vent gas.

3. The process of claim 2 wherein the vent gas passing out of the activated carbon layers during adsorption of radioactive iodine is heated to a temperature of at least 70° C.

4. The process of claim 1 wherein the vent gas passing out of the activated carbon layer during adsorption of radioactive iodine is heated to a temperature of at least 70° C.

5. A process for removing radioactive iodine and radioactive methyl iodide from a vent gas having a relative humidity higher than 40% and containing radioactive iodine and radioactive methyl iodide, said process comprising (1) passing the vent gas through a first activated carbon adsorption bed to adsorb radioactive iodine thereon and produce a partially purified vent gas substantially free of radioactive iodine, (2) heating said partially purified vent gas to a temperature high enough so that the relative humidity of said partially purified vent gas is less than 40% and (3) passing the heated partially purified vent gas through another activated carbon adsorption bed to adsorb radioactive methyl iodide therein by physical adsorption and produce a purified vent gas.

6. The process of claim 5 wherein adsorption of radioactive iodine is accomplished with at least three separate adsorption beds operating in series, one of said separate adsorption beds being desorbed by heating and a second of said adsorption beds being tightly sealed in order to prevent escape therefrom of radioactive iodine during the decay of the radioactivity of the iodine therein while a third of said separate adsorption beds adsorbs radioactive iodine from said vent gas.

7. The process of claim 6 wherein each of said separate activated carbon adsorption beds is repeatedly used for adsorption of iodine, decay of the radioactivity of the adsorbed iodine and desorption of the iodine adsorbed therein.

8. The process of claim 7 wherein each of said separate adsorption beds, after adsorption of iodine therein, is sealed for a time sufficient so that the radioactivity of the radioactive iodine therein is substantially completely decayed.

9. The process of claim 8 wherein the partially purified vent gas is heated to at least about 70° C.

10. The process of claim 9 wherein the vent gas has a relative humidity of about 100%.

11. A process for decontaminating a vent gas having a relative humidity of at least 40% and containing radioactive iodine and radioactive methyl iodide, said process comprising passing said vent gas into a series of separate adsorption beds to remove radioactive iodine from said vent gas and produce a partially purified vent gas substantially free of radioactive iodine, said series of separate adsorption beds including at least 3 separate activated carbon adsorption beds operated in series, each adsorption bed in said series repeatedly (1) adsorbing radioactive iodine for a predetermined period of time, (2) retaining adsorbed radioactive iodine therein until the radioactivity of the iodine has decayed, and (3) desorbing the adsorbed iodine, one of said separate activated carbon adsorption beds being desorbed and a second of said activated carbon adsorption beds retaining iodine therein for decay of the radioactivity thereof while a third of said adsorption beds adsorbs iodine therein, said process further comprising heating said partially purified vent gas to a temperature high enough so that the relative humidity of said partially purified vent gas is less than 40% and passing the heated partially purified vent gas through another activated carbon adsorption bed to physically adsorb radioactive methyl iodide therein and produce a purified vent gas, said another activated carbon adsorption bed having a size sufficient so that radioactive methyl iodide is retained therein until the radioactivity of said radioactive iodide is substantially completely decayed.

12. The process of claim 11 wherein said vent gas has a relative humidity of about 100% and further wherein said partially purified vent gas is heated to a temperature of at least 70° C.

13. The process of claim 12 wherein each of said separate adsorption beds during step (2) for effecting decay of radioactivity of radioactive iodide retained therein is sealed for about 80 days.

14. The process of claim 11 wherein each of said separate adsorption beds during step (2) for effecting decay of the radioactivity of radioactive iodide retained therein is sealed for about 80 days.

15. The process of claim 14 wherein one of said separate activated carbon beds undergoes adsorption for a period of about 80 days while a second of said separate carbon adsorption beds is sealed for 80 days for decay of the radioactivity of the iodine therein.

* * * * *